United States Patent [19]

Winter et al.

[11] Patent Number: 5,731,254

[45] Date of Patent: Mar. 24, 1998

[54] PROCESS FOR THE PREPARATION OF A SYNDIOTACTIC POLYOLEFIN

[75] Inventors: Andreas Winter, Kelkheim/Taunus; Jürgen Rohrmann, Liederbach; Martin Antberg, Hofheim am Taunus; Volker Dolle, Kelkheim/Taunus; Walter Spaleck, Liederbach, all of Germany

[73] Assignee: Hoechst, Germany

[21] Appl. No.: 462,110

[22] Filed: Jun. 5, 1995

Related U.S. Application Data

[62] Division of Ser. No. 325,558, Oct. 18, 1994, abandoned, which is a continuation of Ser. No. 759,093, Sep. 6, 1991, abandoned, which is a continuation of Ser. No. 490,363, Mar. 8, 1990, abandoned.

[30] Foreign Application Priority Data

Mar. 11, 1989 [DE] Germany .......................... 39 07 965.1

[51] Int. Cl.$^6$ .............................. C08F 4/642; C08F 10/04
[52] U.S. Cl. ......................... 502/117; 502/103; 526/122; 526/127; 526/160; 526/351; 526/905; 526/943
[58] Field of Search ........................... 502/103, 117

[56] References Cited

U.S. PATENT DOCUMENTS

| | | | |
|---|---|---|---|
| 3,258,455 | 6/1966 | Natta et al. | |
| 3,305,538 | 2/1967 | Natta et al. | |
| 4,769,510 | 9/1988 | Kaminsky et al. | 526/165 |
| 4,892,851 | 1/1990 | Ewen et al. | 526/160 |
| 4,952,540 | 8/1990 | Kioka et al. | 526/160 |
| 5,001,205 | 3/1991 | Hoel | 526/128 |
| 5,017,714 | 5/1991 | Welborn | 526/160 |
| 5,416,178 | 5/1995 | Winter et al. | 526/127 |

FOREIGN PATENT DOCUMENTS

| | | |
|---|---|---|
| 0 351 392 | 1/1990 | European Pat. Off. . |
| 3 726 067 | 2/1989 | Germany . |

OTHER PUBLICATIONS

Lutz, F. et al, Macromolecules, "*An Exact Method To Determine the Complete Orientation Distribution Function of the Chain Axis from an Arbitrary (hkl) Reflection*", vol. 21, pp. 2375–2382 (1988).

Ewen, J. A. et al, J. Am. Chem. Soc., "*Syndiospecific Propylene Polymerizations with Group 4 Metallocenes*", vol. 110, pp. 6255–6256 (1988).

*Primary Examiner*—Edward J. Smith
*Attorney, Agent, or Firm*—Connolly & Hutz

[57] ABSTRACT

A syndiotactic polyolefin is obtained in a high yield by polymerization or copolymerization of an olefin of the formula $R^a$—CH=CH—$R^b$ in the presence of a catalyst consisting of a metallocene of the formula I

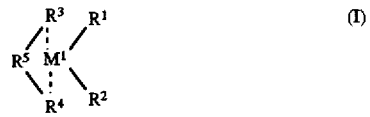

in which $M^1$ is titanium, zirconium, vanadium, niobium or tantalum, and an aluminoxane. This polyolefin has a very high molecular weight, a very narrow molecular weight distribution and a very high syndiotactic index. Shaped articles produced from the polymer are distinguished by a high transparency, flexibility, tear resistance and an excellent surface gloss.

6 Claims, No Drawings

PROCESS FOR THE PREPARATION OF A SYNDIOTACTIC POLYOLEFIN

This application is a divisional of application Ser. No. 08/325,558 filed Oct. 18, 1994 which is a continuation of Ser. No. 07/759,093 filed Sep. 6, 1991 which, in turn, is a continuation of Ser. No. 07/490,363 filed Mar. 8, 1990, all now abandoned.

The invention relates to a novel process, which can be employed on a large industrial scale, for the preparation of a syndiotactic polyolefin.

Syndiotactic polyolefins, in particular syndiotactic polypropylene, are known per so. However, it has not yet been possible to prepare such polymers in an adequate yield under polymerization conditions which are of industrial interest.

Thus, it is known that syndiotactic polypropylene can be prepared by polymerization of propylene at −78° C. in the presence of a catalyst system consisting of $VCl_4$, anisole, heptane and diisobutylaluminum chloride (compare B. Lotz et al., Macromolecules 21 (1988), 2375). However, the syndiotactic index (=76.9%) and the yield (=0.16%) are too low.

It is furthermore known that a syndiotactic polypropylene having a narrow molecular weight distribution can be obtained in a significantly improved yield with the aid of a catalyst consisting of isopropylene(cyclopentadienyl) (9-fluoranyl)-zirconium dichloride or isopropylene (cyclopentadienyl) (9-fluorenyl)-hafnium dichloride and a methylaluminoxane at a temperature of 25° to 70° C. (compare J. A. Ewen et al., J. Am. Chem. Soc., 110 (1988), 6255). Nevertheless, the molecular weight of the polymer which can be achieved with the zirconium compound is still too low and the yield which can be achieved by means of the hafnium compound is inadequate for an industrial process. Moreover, the syndiotactic characteristics which can be achieved are still in need of improvement.

There was therefore the object of discovering a process which enables syndiotactic polyolefins of high molecular weight, narrow molecular weight distribution and a syndiotactic index of mere than 90% to be obtained in a high yield.

The invention thus relates to a process for the preparation of a syndiotactic polyolefin by polymerization or copolymerization of an olefin of the formula $R^aH=CHR^b$, in which $R^a$ and $R^b$ are identical or different and denote a hydrogen atom or an alkyl radical having 1 to 28 carbon atoms, or $R^a$ and $R^b$, with the atoms joining them, can form a ring, at a temperature of −60° to 200° C. under a pressure of 0.5 to 100 bar in solution, suspension or the gas phase in the presence of a catalyst which consists of a metallocene as the transition metal component and an aluminoxane of the formula II

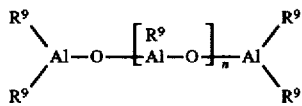  (II)

for the linear type and/or of the formula III

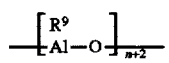  (III)

for the cyclic type, in which, in the formulae II and III, $R^9$ denotes a $C_1$-$C_6$-alkyl group or phenyl or benzyl and n is an integer from 2 to 50, which comprises carrying out the polymerization in the presence of a catalyst, the transition metal component of which is a compound of the formula I

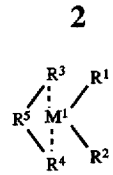  (I)

in which
$M^1$ is titanium, zirconium, vanadium, niobium or tantalum, $R^1$ and $R^2$ are identical or different and denote a hydrogen atom, a halogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group or a $C_8$-$C_{40}$-arylalkenyl group.

$R^3$ and $R^4$ are different and denote a mono- or polynuclear hydrocarbon radical which can form a sandwich structure with the central atom $M^1$, $R^5$ is

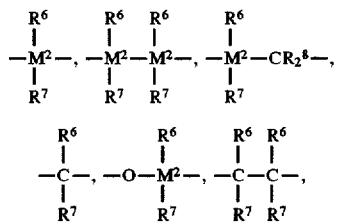

$=BR^6$, $-AlR^6$, $-Ge-$, $-Sn-$, $-O-$, $-S-$, $-SO$, $-SO_2$, $=NR^6$, $=CO$, $=PR^6$ or $=P(O)R^5$, in which $R^6$, $R^7$ and $R^8$ are identical or different and denote a hydrogen atom, a halogen atom, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^6$ and $R^7$ or $R^6$ and $R^8$, in each case with the atoms joining them, form a ring, and $M^2$ is silicon, germanium or tin.

The catalyst to be used in the process according to the invention consists of an aluminoxane and a metallocene of the formula I

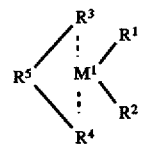  (I)

In formula I, $M^1$ is a metal from the group comprising titanium, zirconium, vanadium, niobium and tantalum, preferably zirconium.

$R^1$ and $R^2$ are identical or different and denote a hydrogen atom, a $C_1$-$C_{10}$—, preferably $C_1$-$C_3$-alkyl group, a $C_1$-$C_{10}$—, preferably $C_1$-$C_3$-alkoxy group, a $C_6$-$C_{10}$—, preferably $C_6$-$C_8$-aryl group, a $C_6$-$C_{10}$—, preferably $C_6$-$C_8$-aryloxy group, a $C_2$-$C_{10}$—, preferably $C_2$-$C_4$-alkenyl group, a $C_7$-$C_{40}$—, preferably $C_7$-$C_{10}$-arylalkyl group, a $C_7$-$C_{40}$—, preferably $C_7$-$C_{12}$-alkylaryl group, a $C_8$-$C_{40}$—, preferably $C_8$-$C_{12}$-arylalkenyl group or a halogen atom, preferably chlorine.

$R^3$ and $R^4$ are different and denote a mono- or polynuclear hydrocarbon radical which cab form a sandwich structure with the central atom $M^1$.

$R^3$ and $R^4$ are preferably fluorenyl and cyclopentadienyl, it also being possible for the parent structure to carry additional substituents.

$R^5$ is a single- or multi-membered bridge which links the radicals $R^3$ and $R^4$ and denotes

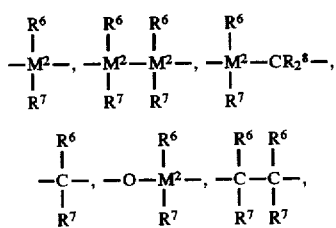

$=BR^6$, $=AlR^6$, —Ge—, —Sn—, —O—, —S—, =SO, $=SO_2$, $=NR^6$, =CO, $=PR^6$ or $P(O)R^6$, in which $R^6$, $R^7$ and $R^8$ are identical or different end denote a hydrogen atom, a halogen atom, preferably chlorine, a $C_1$–$C_{10}$—, preferably $C_1$–$C_3$-alkyl group, in particular a methyl group, a $C_1$–$C_{10}$-fluoroalkyl group, preferably a $CF_3$ group, a $C_8$–$C_{10}$-fluoroaryl group, preferably a pentafluorophenyl group, a $C_6$–$C_{10}$—, preferably $C_6$–$C_8$-aryl group, a $C_1$–$C_{10}$—, preferably $C_1$–$C_4$-alkoxy group in particular a methoxy group, a $C_2$–$C_{10}$—, preferably $C_2$–$C_4$-alkenyl group, a $C_7$–$C_{40}$, preferably $C_7$–$C_{10}$-arylalkyl group, a $C_8$–$C_{40}$—, preferably $C_8$–$C_{12}$-arylalkenyl group or a $C_7$–$C_{40}$—, preferably $C_7$–$C_{12}$-akylaryl group, or $R^6$ and $R^7$ or $R^6$ and $R^8$, in each case together with the atoms joining them, form a ring.

$M^2$ is silicon, germanium or tin, preferably silicon or geranium.

$R^5$ is preferably $=CR^6R^7$, $=SiR^6R^7$, $=GeR^6R^7$, —O—, —S—, =SO, $=PR^5$ or $=P(O)R^6$.

The metallocenes described above can be prepared in accordance with the following general reaction scheme:

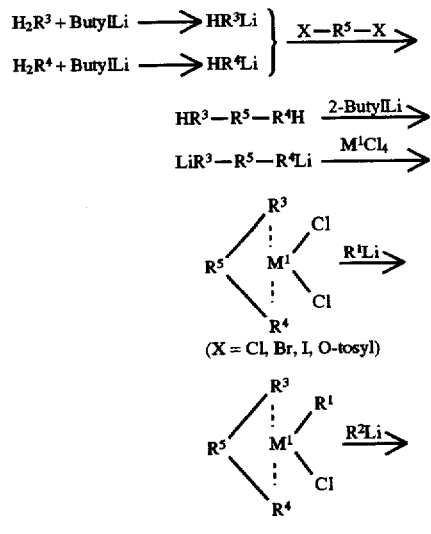

(X = Cl, Br, I, O-tosyl)

or

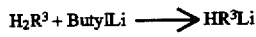

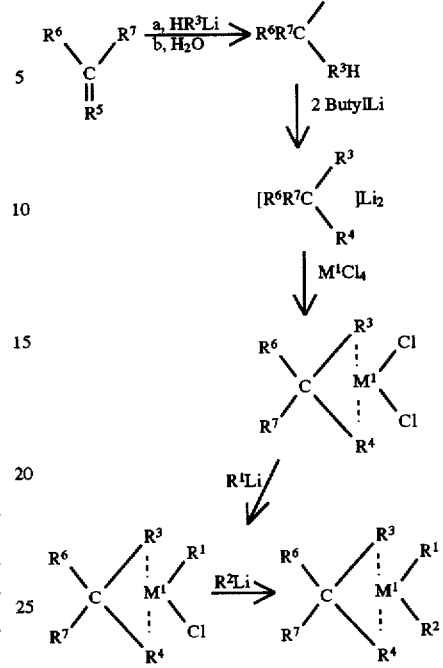

Metallocenes which are preferably employed are (arylalkylidene)(9-fluorenyl)(cyclopentadienyl)zirconium dichloride, (diarylmethylene)(9-fluorenyl) (cyclopentadienyl)zirconium dichloride and (dialkylmethylene)(9-fluorenyl)(cyclopentadienyl) zirconium dichloride.

(Methyl(phenyl)methylene)(9-fluorenyl) (cyclopentadienyl zirconium dichloride, (diphenylmethylene)(9-fluorenyl)(cyclopentadienyl) zirconium dichloride and dimethylmethylene) (9-fluorenyl) (cyclopentadienyl)zirconium dichloride are particularly preferred here.

The cocatalyst is an aluminoxane of the formula II

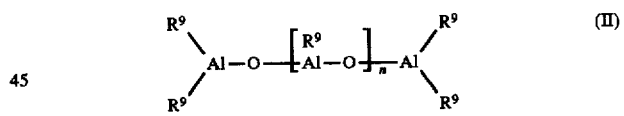

(II)

for the linear type and/or of the formula III

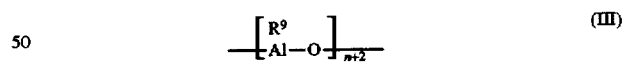

(III)

for the cyclic type. In these formulae, the radicals $R^8$ denote a $C_1$–$C_6$-alkyl group, preferably methyl, ethyl, isobutyl, butyl or neopentyl, or phenyl or benzyl. Methyl is particularly preferred. n is an integer from 2 to 50, preferably 5 to 40. However, the exact structure of the aluminoxane is not known.

The aluminoxane can be prepared in various ways.

One possibility is careful addition of water to a dilute solution of an aluminum trialkyl by introducing in each case small portions of the solution of the aluminum trialkyl, preferably aluminum trimethyl, and the water into an initial larger amount of an inert solvent and in between each addition waiting for the evolution of gas to end.

In another process, finely powdered copper sulfate pentahydrate is suspended in toluene in a glass flask and aluminium trialkyl is added under an inert gas at about −20°

C. in an amount so that about 1 mol of $CuSO_4.5H_2O$ is available for every 4 Al atoms. After slow hydrolysis, alkane being split off, the reaction mixture is left it room temperature for 24 to 48 hours, during which it must be cooled if necessary, so that the temperature does not rise above 30° C. The aluminoxane dissolved in the toluene is then filtered off from the copper sulfate and the solution is concentrated in vacuo. It is assumed that the low molecular weight aluminoxanes undergo condensation to higher oligomers, aluminum trialkyl being split off, in these preparation processes.

Aluminoxanes are furthermore obtained by a procedure in which aluminum trialkyl, preferably aluminum trimethyl, dissolved in an inert aliphatic or aromatic solvent, preferably heptane or toluene, is reacted with aluminum salts, preferably aluminium sulfate, containing water of crystallization at a temperature of –20° to 100° C. In this procedure, the volume ratio between the solvent and the aluminum alkyl used is 1:1 to 50:1—preferably 5:1—and the reaction time, which can be controlled by splitting off the alkane, is 1 to 200 hours—preferably 10 to 40 hours.

Of the aluminum salts containing water of crystallization, those which have a high content of water of crystallization are used in particular. Aluminum sulfate hydrate is particularly preferred, above all the compounds $Al_2(SO_4)_3.16H_2O$ and $Al_2(SO_4)_3.18H_2O$, with the particularly high water of crystallization content of 16 and 18 mol of $H_2O$/mol of $Al_2(SO_4)_3$ respectively.

Another variant for the preparation of aluminoxanes comprises dissolving aluminum trialkyl, preferably aluminum trimethyl, in heptane or toluene in the suspending agent, preferably in liquid monomer, which has been initially introduced into the polymerisation vessel, and then reacting the aluminum compound with water.

In addition to the processes described above for the preparation of aluminoxanes, there are others which can be used. Regardless of the nature of the preparation, all the aluminoxane solutions have the common feature of a varying content of unreacted aluminum trialkyl, which is present in free form or as an adduct. This content has an influence on the catalytic activity which has not yet an precisely clarified, and which varies according to the metallocene compound employed.

It is possible to preactivate the metallocene before use in the polymerization reaction with an aluminoxane of the formula II and/or III. The polymerization activity is in this way increased significantly and the grain morphology improved.

The preactivation of the transition metal compound is carried out in solution. Preferably, in this preactivation, the metallocene is dissolved in a solution of the aluminoxane in an inert hydrocarbon. An aliphatic or aromatic hydrocarbon is suitable as the inert hydrocarbon. Toluene is preferably used.

The concentration of the aluminoxane in the solution is in the range from about 1% by weight to the saturation limit, preferably 5 to 30% by weight, in each case based on the total solution. The metallocene can be employed in the same concentration, but it is preferably employed in an amount of $10^{-4}-1$ mol per mol of aluminoxane. The preactivation time is 5 minutes to 60 hours, preferably 5 to 60 minutes. The reaction is carried out at a temperature of –78° C. to 100° C., preferably 0° to 70° C.

A significantly longer preactivation is possible, but this usually neither increases the activity nor reduces the activity, although it maybe entirely appropriate for storage purposes.

The polymerization is carried out in a known manner in solution, in suspension or in the gas phase, continuously or discontinuously in one or more stages at a temperature of –60° to 200° C., preferably –30° to 100° C., in particular 0° to 80° C.

The total pressure in the polymerization system is 0.5 to 100 bar. Polymerization in the pressure range of 5 to 60 bar which is of particular industrial interest is preferred. Monomers of boiling point higher than the polymerization temperature are preferably polymerised under normal pressure.

The metallocene compound is used in this reaction in a concentration, based on the transition metal, of $10^{-3}$ to $10^{-7}$, preferably $10^{-4}$ to $10^{-6}$ mol of transition metal per $dm^3$ of solvent or per $dm^3$ of reactor volume. The aluminoxane is used in a concentration of $10^{-5}$ to $10^{-1}$ mol, preferably $10^{-5}$ to $10^{-2}$ mol per $dm^3$ of solvent or per $dm^3$ of reactor volume. In principle, however, higher concentrations are also possible.

When the polymerization is carried out as suspension or solution polymerization, an inert solvent which is customary for the Ziegler low pressure process is used. For example, the reaction is carried out in an aliphatic or cycloaliphatic hydrocarbon; examples of these which may be mentioned are butane, pentane, hexane, heptane, isooctane, cyclohexane, and methycyclohexane.

A benzine or hydrogenated diesel oil fraction can furthermore be used. Toluene can also be used. The polymerization is preferably carried out in a liquid monomer.

Olefins of the formula $R^aCH=CHR^b$, in which $R^a$ and $R^b$ are identical or different and denote a hydrogen atom or an alkyl radical having 1 to 28 carbon atoms, or wherein $R^a$ and $R^b$, with the atoms joining them, can form a ring, are polymerized or copolymerized. Examples of such olefins are ethylene, propylene, 1-butene, 1-hexene, 4-methyl-1-pentene, 1-octene, norbornene or norbornadiene. Propylene, 1-butene and 4-methyl-1-pentene are preferred.

The polymerization can be of any desired duration, since the catalyst system to be used according to the invention exhibits only a slight time-dependent decrease in polymerization activity.

Polymer powders which consist of compact spherical particles having a very narrow particle size distribution and a high bulk density can be prepared by means of the process according to the invention. The polymer powder is distinguished by very good free-flowing properties.

The polymer has a very high molecular weight, a very narrow molecular weight distribution (polydispersivity) and a very high syndiotactic index. Shaped articles produced from the polymers are distinguished by a high transparency, flexibility, tear strength and an excellent surface gloss.

Polymers of higher molecular weight are formed by using specifically bridged metallocenes according to the invention than by using metallocenes of the prior art. At the same time, the syndiotactic index is improved significantly.

The polymers prepared according to the invention are particularly suitable for the production of films and hollow bodies.

The following examples are intended to illustrate the invention.

In the examples:

VN=viscosity number in $cm^3/g$ $M_w$=weight-average molecular weight in g/mol $M_n$=number-average molecular weight in g/mol $M_w/M_n$=polydispersity The molecular weights were determined by gel permeation chromatography.

SI=syndiotactic index, determined by $^{13}C$-NMR spectroscopy $n_{syn}$=average syndiotactic block length $(1+2r/m)$ BIH=ball indentation hardness in Nmm$^{-2}$ (measured on flat test speciments 4 mm thick in accordance with DIN 53456/1973)

MFI=melt flow index (230° C., 5 kg; DIN 53735)

All the following working operations of the metallocene synthesis are carried out under an inert gas using absolute solvents.

EXAMPLE 1

(Phenyl (methyl)methylene) (9-fluorenyl) (cyclopentadienyl)zirconium dichloride

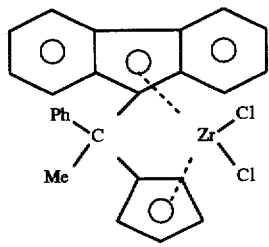

A solution of 67.8 mmol of lithiumfluorene in 50 cm$^3$ of tetrahydrofuran is added to a solution of 11.4 g (67.8 mmol) of 6-methyl-6-phenyl-fulvene in 40 cm$^3$ of tetrahydrofuran at room temperature. After the mixture had been stirred at room temperature for 2 hours, 60 cm$^3$ of water were added. The substance which precipitated during this procedure was filtered off with suction, washed with diethyl ether and dried under an oil pump vacuum. 19.1 g (84.2%) of 2,2-cyclopentadienyl(9-fluorenyl)-ethylbenzene were obtained (correct elemental analyses; $^1$H-NMR spectra).

10.0 g (29.9 mmol) of the compound were dissolved in 60 cm$^3$ of tetrahydrofuran, and 26 cm$^3$ (65 mmol) of a 2.5 molar hexane solution of n-butyllithium were added at 0° C. After the mixture had been stirred for 15 minutes, the solvent was stripped off in vacuo. The dark red residue which remained was washed several rises with hexane and dried under an oil pump vacuum. 15.6 g of the red dilithium salt were obtained as a tetrahydrofuran adduct; this contained about 30% of tetrahydrofuran.

14.9 mmol of the dilithium salt were added to a suspension of 3.48 g (14.9 mmol) of ZrCl$_4$ in 70 cm$^3$ of CH$_2$Cl$_2$ at −78° C. After the mixture had been slowly warmed to room temperature, it was stirred at room temperature for a further hour and filtered over a G4 frit; the residue was rinsed several times with CH$_2$Cl$_2$. The red filtrate was concentrated completely and the orange-red residue was recrystallized from CH$_2$Cl$_2$. 1.8 g (25%) of methylphenylmethylene-(cyclopentadienyl-9-fluorenyl)zirconium dichloride were obtained as a pink-colored crystalline powder. $^1$-NMR spectrum (100 MHz, CDCl$_2$): 7.1–8.25 (m, Flu-H, Ph-H), 6.90 (m, Ph-H), 6.10–6.50 (m, Ph-H, Cp-H), 5.90, 5.75 (2 x m, Cp-H), 2.55 (s, CH$_3$).

EXAMPLE 2

Diphenylmethylene (9-fluorenyl) (cyclopentadienyl) zirconium dichloride

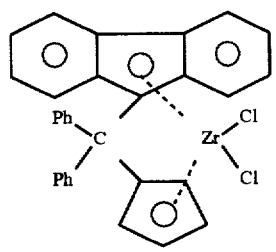

12.3 cm$^3$ (30.7 mmol) of a 2.5 molar hexane solution of n-butyllithium were slowly added to a solution of 5.10 g (30.7 mmol) of fluorene in 60 cm$^3$ of tetrahydrofuran at room temperature. After 40 minutes, 7.07 g (30.7 mmol) of diphenylfulvene were added to the orange solution and the mixture was stirred overnight. 60 cm$^3$ of water were added to the dark red solution, whereupon the solution became yellow in color, and the solution was extracted with ether. The ether phase was dried over MgSO$_4$ and concentrated and the residue was left to crystallize at −35° C. 5.1 g (42%) of 1,1-cyclopentadienyl-(9-fluorenyl)diphenylmethane were obtained as a beige powder.

2.0 g (5.0 mmol) of the compound were dissolved in 20 cm$^3$ of tetrahydrofuran, and 6.4 cm$^3$ (10 mmol) of a 1.6 molar solution of butyllithium in hexane were added at 0° C. After the mixture had been stirred at room temperature for 15 minutes, the solvent was stripped off and the red residue was dried under an oil pump vacuum and washed several times with hexane. After the product had been dried under an oil pump vacuum, the red powder was added to a suspension of 1.16 g (5.00 mmol) of ZrCl$_4$ at −78° C. After slowly warming up, the mixture was stirred at room temperature for a further 2 hours. The pink-colored suspension was filtered over a G3 frit. The pink-red residue was washed with 20 cm$^3$ of CH$_2$Cl$_2$, dried under an oil pump vacuum and extracted with 120 cm$^3$ of toluene. After the solvent had been stripped off and the residue had been dried under an oil pump vacuum, 0.55 g of the zirconium complex was obtained in the form of a pink-red crystalline powder.

The orange-red filtrate of the reaction mixture was concentrated and the residue was left to crystallize at −35° C. A further 0.45 g of the complex crystallized from CH$_2$Cl$_2$. Total yield 1.0 g (36% ). Correct elemental analyses. The mass spectrum showed M$^+$556. $^1$H-NMR spectrum (100 MHz, CDCl$_3$): 6.90–8.25 (m, 16, Flu-H, Ph-H), 6.40 (m,2, Ph-H), 6.37 (t,z, Cp-H), 5.80 (t,z, Cp-H).

The metallocene dimethylmethylene(fluorenyl) (cyclopentadienyl)zirconium dichloride was prepared in accordance with the literature reference J. Am. Chem. Soc. 110 (1988) 6255.

EXAMPLE 3

A dry 16 dm$^3$ reactor was flushed with nitrogen and filled with 10 dm$^3$ of liquid propylene. 30 cm$^3$ of a toluene solution of methylaluminoxane (corresponding to 40 mmol of Al, average degree of oligomerization of the methylaluminoxane n=20) ware then added and the mixture was stirred for 15 minutes. In parallel with this, 12.4 mg (0.223 mmol) of diphenylmethylene(9-fluorenyl) (cyclopentadienyl)zirconium dichloride were dissolved in 15 cm of a toluene solution of methylaluminoxane (20 mmol of Al). After 15 minutes, the solution was introduced into the reactor and the polymerization temperature was brought to 70° C. The polymerization had ended after a polymerization time of 1 hour. 2.19 kg of polypropylene, corresponding to a metallocene activity of 176.6 kg of polypropylene/g of metallocene×hour, were obtained. VN=385 cm$^3$/g; $M_w$=519,000, $M_n$=173,000, $M_w/M_n$=3.0; SI=95.9%, $n_{syn}$=36.7; MFI 230/5=0.2 dg/minute.

EXAMPLE 4

The procedure was analogous to Example 3, but 11.9 mg (0.021 mmol) of diphenylmethylene (9-fluoranyl)(cyclopentadienyl)zirconium dichloride was employed. The polymerization temperature was 60° C. and the polymerization time was 1 hour. 0.95 kg of polypropylene, corresponding to a metallocene activity of 79.8 kg of polypropylene/g of metallocene×hour, were obtained.

VN=459 cm$^3$/g; $M_w$=547,000, $M_n$=188,000, $M_w/M_n$=2.9; SI=96.5%, $n_{syn}$=38.4; MFI 230/5=<0.1 dg/minute.

EXAMPLE 5

The procedure was analogous to Example 3, but 18.5 mg (0.033 mmol) of diphenylmethylene(9-fluorenyl)(cyclopentadienyl)zirconium dichloride were employed. The polymerization temperature was 50° C. and the polymerization time was 80 minutes. 0.69 kg of polypropylene, corresponding to a metallocene activity of 28.0 kg of polypropylene/g of, metallocene×hour, were obtained.

VN=565 cm$^3$/g; $M_w$=584,000, $M_n$=241,500, $M_w/M_n$=2.4; SI=95.9%, $n_{syn}$=36.4; MFI 230/5=<0.1 dg/minute.

EXAMPLE 6

The procedure was analogous to Example 3, but 30.1 mg (0.054 mmol) of diphenylmethylene(9-fluorenyl)(cyclopentadienyl)zirconium dichloride were employed. The polymerization temperature was 40° C. and the polymerization lasted 1 hour.

0.35 kg of polypropylene, corresponding to a metallocene activity of 11.6 kg of polypropylene/g of metallocene×hour, was obtained.

VN=664 cm$^3$/g; $M_w$=925,000, $M_n$=329,000, $M_w/M_n$=2.8; SI=96.7%, $n_{syn}$=40.1; MFI 230/5=<0.1 dg/minute.

EXAMPLE 7

The procedure was analogous to Example 3, but 40.0 mg (0.072 mmol) of diphenylmethylene(9-fluorenyl)(cyclopentadienyl)zirconium dichloride were employed. The polymerization temperature was 30° C. and the polymerization time was 2 hours.

0.50 kg of polypropylene, corresponding to a metallocene activity of 6.3 kg of polypropylene/g of metallocene×hour, was obtained.

VN=788 cm$^3$/g; $M_w$=1.05·10$^5$, $M_n$=367,000, $M_w/M_n$=2.8; SI=97.1%, $n_{syn}$=46.0; MFI 230/5=<0.1 dg/minute.

EXAMPLE 8

The procedure was analogous to Example 3, but 10.9 mg (0.022 mmol) of phenyl(methyl)methylene(9-fluorenyl)(cyclopontadienyl)zirconium dichloride were employed. 2.05 kg of polypropylene were obtained, corresponding to a metallocene activity of 188.1 kg of polypropylene/g of metallocene×hour.

VN=305 cm$^3$/g; $M_w$=435,000, $M_n$=181,000, $M_w/M_n$=2.4; SI=96.1%, $n_{syn}$=37.4; MFI 230/5=0.5 dg/minute

EXAMPLE 9

The procedure was analogous to Example 4, but 13.5 mg (0.027 mmol) of phenyl(methyl)methylene(9-fluorenyl)(cyclopentadienyl)zirconium dichloride were employed. 0.94 kg of polypropylene, corresponding to a metallocene activity of 69.5 kg of polypropylene/g of metallocene×hour, was obtained.

VN=364 cm$^3$/g; $M_w$=490,000, $M_n$=188,500, $M_w/M_n$=2.6; SI=97.0%, $n_{syn}$=40.2; MFI 230/5=0.25 dg/minute.

EXAMPLE 10

The procedure was analogous to Example 6, but 35.0 mg (0.071 mmol) of phenyl(methyl)methylene(9-fluorenyl)(cyclopentadienyl)zirconium dichloride were employed and the polymerization lasted 5 hours.

1.77 kg of polypropylene were obtained, corresponding to a metallocene activity of 10.1 kg of polypropylene/g of metallocene×hour.

VN=545 cm$^3$/g; $M_w$=554,000, $M_n$=205,000, $M_w/M_n$=2.7; SI=96.9%, $n_{syn}$=39.4; MFI 230/5=<0.1 dg/minute.

EXAMPLE 11

The procedure was analogous to Example 3, but 30 mg (0.061 mmol) of phenyl(methyl)methylene(9-fluorenyl)(cyclopentadienyl)zirconium dichloride were employed, the polymerization temperature was 22° C. and the polymerization time was 5 hours.

0.83 kg of polypropylene, corresponding to a metallocene activity of 5.5 kg of polypropylene/g of metallocene×hour, was obtained.

VN=750 cm$^3$/g; $M_w$=925,000, $M_n$=330,500, $M_w/M_n$=2.8; SI=98.1%, $n_{syn}$=54.7; MFI 230/5=<0.1 dg/minute.

Examples 3 to 11 demonstrate that molecular wights of the polymers which are greater than those achieved with the best hafnocenes known from the literature can be achieved with zirconocenes, coupled with excellent metallocene activities.

EXAMPLE 12

A dry 16 dm$^3$ reactor was flushed with nitrogen and filled with 1.6 Ndm$^3$ (corresponding to 0.1 bar) of hydrogen end with 10 dm$^3$ of liquid propylene. 30 cm$^3$ of a toluene solution of methylaluminoxane (corresponding to 40 mmol of Al, average degree of oligomerization of the methylaluminoxane n=20) were then added end the mixture was stirred for 15 minutes. In parallel with this, 20.2 mg (0.047 mmol) of dimethylmethylene(9-fluorenyl)(cyclopentadienyl)zirconium dichloride were dissolved in 15 cm$^3$ of a toluene solution of methylaluminoxane (20 mmol of Al). After 15 minutes, the solution was metered into the reactor and the polymerization temperature was brought to 50° C. The polymerization lasted 2 hours. 1.38 kg of syndiotactic polypropylene, corresponding to a metallocene activity of 34.2 kg of polypropylene/g of metallocene×hour, were obtained.

VN=117 cm$^3$/g; $M_w$=101,000, $M_n$=45,150, $M_w/M_n$=2.2; SI=95.0%, BIH=35 Nmm$^{-2}$; MFI 230/5=44 dg/minute.

EXAMPLE 13

The procedure was as in Example 12, but 8 Ndm$^3$ (corresponding to 0.5 bar) of hydrogen end 11.9 mg (0.028 mmol) of the metallocene were employed. The polymerization temperature was 60° C. and the polymerization lasted 2 hours.

1.19 kg of syndiotactic propylene, corresponding to a metallocene activity of 50.0 kg of polypropylene/g of metallocene×hour, were obtained.

VN=85.0 cm³/g; $M_w$=74,100, $M_n$=35,000, $M_w/M_n$=2.1; SI=96.1%, BIH=40 Nmm⁻²; MFI 230/5=123 dg/minute.

EXAMPLE 14

The procedure was as in Example 12, but 40 Ndm³ (corresponding to 2.5 bar) of hydrogen and 12.0 mg (0.028 mmol) of the metallocene were employed. The polymerization temperature was 60° C. and the polymerization lasted 3 hours.

2.34 kg of syndiotactic propylene, corresponding to a metallocene activity of 65.0 kg of polypropylene/g of metallocene×hour, were obtained.

VN=68 cm³/g; $M_w$=57,100, $M_n$=22,850, $M_w/M_n$=2.5; SI=97.2%, BIH=40 Nmm⁻²; MFI 230/5=0.25 dg/minute.

EXAMPLE 15

The procedure was analogous to Example 12, but 10.3 mg (0.019 mmol) of diphenylmethylene(fluorenyl)(cyclopentadienyl)zirconium dichloride were employed. The polymerization lasted 4 hours.

1.78 kg of polypropylene, corresponding to a metallocene activity of 43.2 kg of polypropylene/g of metallocene×hour, were obtained.

VN=430 cm³/g; $M_w$=434,000, $M_n$=179,500, $M_w/M_n$=2.4; SI=96.7%, $n_{syn}$=38.5.

According to the ¹³C-NMR, the polymer chains contained no unsaturated chain ends.

EXAMPLE 16

The procedure was analogous to Example 12, but 40 Ndm³ (corresponding to 2.5 bar) of hydrogen and 10.7 mg (0.019 mmol) of diphenylmethylene (9-fluorenyl)(cyclopentadienyl)zirconium dichloride were employed. The polymerization lasted 1 hour.

1.06 kg of polypropylene were obtained, corresponding to a metallocene activity of 99.1 kg of polypropylene/g of metallocene×hour.

VN=137 cm³/g; $M_w$=88,700, $M_n$=39,400, $M_w/M_n$=2.3; SI=96.9%, $n_{syn}$=39.1; MFI 230/5=36 dg/min, BIH=39 Nmm⁻².

Examples 12–16 show that the molecular weight can be regulated using hydrogen.

EXAMPLE 17

A dry 16 dm³ reactor was flushed with nitrogen and filled with 10 dm³ of liquid propylene. 30 cm³ of a toluene solution of methylaluminoxane (corresponding to 40 mmol of Al, average degree of oligomerization of the methylaluminoxane n=20) were then added and the mixture was stirred for 15 minutes.

In parallel with this, 10.3 mg (0.024 mmol) of dimethylmethylene (9-fluoenyl) (cyclopentadienyl)zirconium dichloride were dissolved in 15 cm³ of a toluene solution of methylaluminoxane (20 mmol of Al). After 15 minutes, the solution was introduced into the reactor and the polymerization temperature was brought to 70° C. The polymerization had ended after 1 hour.

1.33 kg of syndiotactic polypropylene, corresponding to a metallocene activity of 129.1 kg of polypropylene/g of metallocene×hour, were obtained.

VN=105 cm³/g; $M_w$=84,300, $M_n$=39,900, $M_w/M_n$=2.1; SI=94.6%, BIH=33 Nmm⁻²; MFI 230/5=97 dg/minute.

EXAMPLE 18

The procedure was analogous to Example 17, but 13.9 mg (0.032 mmol) of the metallocene were used, the polymerization temperature was 60° C. and the polymerization lasted 2.5 hours.

2.56 kg of syndiotactic polypropylene, corresponding to a metallocene activity of 73.7 kg of polypropylene/g of metallocene×hour, were obtained.

VN=125 cm³/g; $M_w$=95,250, $M_n$=45,950, $M_w/M_n$=2.1; SI=94.6%, MFI 230/5=55 dg/minute.

EXAMPLE 19

The procedure was analogous to Example 17, but 26.4 mg (0.061 mmol) of the metallocene were employed and the polymerization temperature was 50° C. 1.25 kg of syndtotactic polypropylene were obtained, corresponding to a metallocene activity of 47.3 kg of polypropylene/g of metallocene×hour.

VN=135 cm³/g; $M_w$=114,500, $M_n$=55,750, $M_w/M_n$=2.1; SI=95.0%, MFI 230/5=27.5 dg/minute.

EXAMPLE 20

The procedure was analogous to Example 17, but 36.6 mg (0.085 mmol) of the metallocene were used and the polymerization temperature was 40° C.

0.5 kg of syndiotactic polypropylene, corresponding to a metallocene activity of 13.7 kg of polypropylene/g of metallocene×hour, was obtained.

VN=155 cm³/g; $M^w$=129,000, $M_n$=56,000, $M_w/M_n$=2.3; SI=96.0%; MFI 230/5=17.3 dg/minute.

EXAMPLE 21

The procedure was analogous to Example 17, but 51.5 mg (0.119 mmol) of the metallocene were employed, the polymerization temperature was 25° C. end the polymerization lasted 4 hours.

0.98 kg of syndiotactic polypropylene, corresponding to a metallocene activity of 4.8 kg of polypropylene/g of metallocene×hour, was obtained.

VN=200 cm³/g; $M_w$=175,500, $M_n$=66,550, $M_w/M_n$=2.6; SI=95.7%, MFI 230/5=6.3 dg/minute.

Using the metallocene dimethylmethylene(9-fluorenyl)(cyclopentadienyl)zirconium dichloride, which is known from the literature, Examples 17–21 show that, by the polymerization process according to the invention, in each case polymers having significantly higher molecular weights can be prepared than has been found in the literature (J. Am. Chem. Soc. 110 (1988), 6255) at the particular polymerization temperature.

| Polymerization temperature [°C.] | $M_w$ [g/mol] Process according to the invention | Literature |
| --- | --- | --- |
| 70 | 84300 | 55000 |
| 60 | 95250 | 52000 |

| Polymerization temperature [°C.] | $M_w$ [g/mol] | |
| --- | --- | --- |
| | Process according to the invention | Literature |
| 50 | 114500 | 69000 |
| 25 | 175500 | 133000 |

In particular, the significant decrease in the molecular weight at a polymerization temperature above 25° C. and a reduction to a constant molecular weight value at a polymerization temperature below 50° C. does not occur in the polymerization process according to the invention.

We claim:

1. A catalyst component which comprises the combination of an aluminoxane combined with a transitional metal compound, wherein the aluminoxane is of the formula II

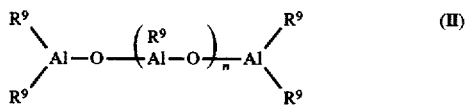

for the linear type and/or of the formula III

for the cyclic type, in which, in the formulae II and III, $R^9$ denotes a $C_1$-$C_6$-alkyl group or phenyl or benzyl and n is an integer from 2 to 50 wherein the transitional metal compound is (Methyl (phenyl)methylene) (9-fluorenyl) (cyclopentadienyl)zirconium dichloride or (diphenylmethylene) (9-fluorenyl) (cyclopentadienyl) zirconium dichloride.

2. The catalyst as claimed in claim 1, wherein said aluminoxane is methylaluminoxane.

3. The catalyst as claimed in claim 1, wherein the transitional metal compound is (Methyl(phenyl)methylene)(9-fluorenyl)(cyclopentadienyl)zirconium dichloride and said aluminoxane is methylaluminoxane.

4. The catalyst as claimed in claim 1, wherein the transitional metal compound is (diphenylmethylene)(9-fluorenyl)(cyclopentadienyl)zirconium dichloride and said aluminoxane is methylaluminoxane.

5. A catalyst component which comprises the combination of an aluminoxane combined with a transitional metal compound, wherein the aluminoxane is of the formula II

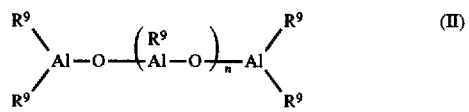

for the linear type and/or of the formula III

for the cyclic type, in which, in the formulae II and III, $R^9$ denotes a $C_1$-$C_6$-alkyl group or phenyl or benzyl and n is an integer from 2 to 50 wherein said transitional metal compound is (arylalkylidene) 9-fluorenyl) (cyclopentadienyl) zirconium dichloride in which the aryl represents an aryl group having 6–10 carbon atoms.

6. A catalyst component which comprises the combination of an aluminoxane combined with a transitional metal compound, wherein the aluminoxane is of the formula II

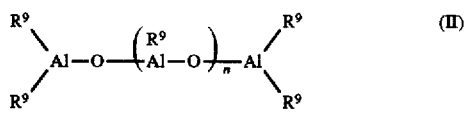

for the linear type and/or of the formula III

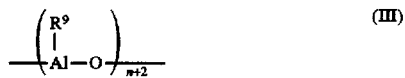

for the cyclic type, in which, in the formulae II and III, $R^9$ denotes a $C_1$-$C_6$-alkyl group or phenyl or benzyl and n is an integer from 2 to 50 wherein said transitional metal compound is (diarylmethylene) (9-fluorenyl)zirconium dichloride in which the aryl represents an aryl group having 6–10 carbon atoms.

* * * * *